UNITED STATES PATENT OFFICE 2,364,618

CONCENTRATION OF OXIDIZED IRON ORES

Earl H. Brown and Francis X. Tartaron, Hibbing, Minn., assignors to Minerals Separation North American Corporation, New York, N. Y., a corporation of Maryland No Drawing. Application March 6, 1944, Serial No. 525,304

6 Claims. (Cl. 209—166)

This invention relates to the concentration of iron ores and more particularly to the concentration of finely-divided low grade iron ores in which the iron is present as one of the several oxides of iron or as the carbonate of iron, and in which the gangue is principally silica or quartz.

In our copending application, Serial No. 496,582, filed July 29, 1943, we have described a method of concentrating finely-divided oxidized iron ores in which the gangue ingredient is principally quartz, which consists in treating an aqueous pulp of such an ore with an anionic collecting agent selected from the class consisting of higher fatty acids and resin acids and mixtures of fatty and resin acids and soaps thereof, and with cooperating agents consisting of lime and an aqueous solution of gelatinized starch; and subjecting the thus treated ore pulp to froth-flotation treatment and removing the quartz-containing froth, thereby producing in the residue of the pulp an oxidized-iron concentrate. In the methods described in that prior application, the starch preferably was gelatinized by boiling it in water with caustic soda; but examples were included in which the method utilized starch which had been gelatinized merely by boiling it in an aqueous suspension, or without heating by merely agitating a mixture of starch and caustic soda in an aqueous suspension.

The present invention is the result of our further discovery that highly satisfactory results may be obtained by practicing the said method with an aqueous solution of starch made soluble by treatment with an oxidizing agent. By "solution" as used in this specification we intend to include both colloidal and molecular dispersions of starch which has been made soluble by treatment with an oxidizing agent in an aqueous mixture. We have found that the best results are obtained if the mixture of starch, oxidizing agent and water is treated only enough to cause partial depolymerization and make the starch miscible with water, but not so as to form degradation products of the nature of dextrin. In general, boiling of the said mixture of starch, oxidizing agent and water for only about one minute has been found to produce a satisfactory starch solution. In practicing the invention, as will appear from the examples hereinafter described, we have successfully used the following typical oxidizing agents: potassium permanganate, chlorinated lime, hydrogen peroxide, ammonium persulphate, sodium hypochlorite, phosphorous oxychloride and sodium peroxide.

The anionic collecting reagents useful in the present methods are the same as those described as useful in the method described in the aforesaid copending application, namely, those selected from the class consisting of higher fatty acids and resin acids and mixtures of fatty and resin acids, and soaps thereof. Examples are hereinafter given of the use, as typical anionic collecting reagents in practicing the invention, of a mixture of fatty and resin acids such as that which is produced as a by-product in paper making and sold under the name "Varlacoid"; linoleic acid, fish oil fatty acid and sodium resinate. In some cases, we have found it advantageous to dilute these collecting agents, particularly "Varlacoid," with cresylic acid or alcohol to facilitate their mixing into the ore pulp. The cresylic acid may also be useful in increasing the amount of froth produced in the flotation operation.

The invention will be understood from the following description of examples of the practicing thereof. In all of the examples, the oxidized-iron ore feed was washer classifier overflow from which an 8% portion which was plus 100 mesh was screened out, ground through 100 mesh and added to the minus 100 mesh, thereby providing a feed which was all minus 100 mesh. An aqueous pulp of this feed, containing about 10% solids, was conditioned with the anionic collecting agents and with the cooperating agents consisting of an aqueous suspension of lime and the aqueous solution of starch; after which the thus conditioned pulp was subjected to froth-flotation treatment, and the silica-containing froth was removed and discarded. Then the residue of this froth-flotation treatment was further conditioned with additional quantities of said reagents, subjected to froth-flotation treatment, and the silica-containing froth was removed and discarded. In some cases, the residue of the second froth-flotation treatment was further conditioned by the addition of more of the anionic collecting agents, was subjected to froth-flotation, and the silica-containing froth was removed and discarded. The pulp was agitated for about one minute after the addition of each reagent. The residue of the aforesaid treatments was the oxidized-iron concentrate.

The following Examples I to VII illustrate successful use of the method of the invention when various oxidizing agents are employed in the preparation of the starch solution. The starch and oxidizing agent were employed in the ratio of 93 to 7 in a 2% solution, except in Example VII in which the ratio was 97-3. The lime employed was in the form of a 25% suspension in water. The anionic collecting reagent was a mixture of Varlacoid and cresylic acid, in the proportion of 95 parts of the former to 5 parts of the latter. The quantities of reagents used in lbs. per ton of feed, were as follows:

| Reagents | First float |
| --- | --- |
| | Lbs./ton |
| Treated starch | 2.5 |
| Lime | 4.0 |
| Varlacoid-cresylic acid (95–5) | 1.0 |

| Reagents | Second float |
| --- | --- |
| | Lbs./ton |
| Treated starch | 0.25 |
| Lime | 1.00 |
| Varlacoid-cresylic acid (95–5) | 0.50 |

| Reagents | Third float |
| --- | --- |
| | Lbs./ton |
| Varlacoid-cresylic acid (95–5) | 0.50 |

Of course, the proportions of and the manner of adding reagents and the number of flotation treatments, may be varied without departing from the spirit and scope of the invention.

EXAMPLE I

*Starch treated with potassium permanganate*

In this example, the starch solution was prepared by boiling an aqueous mixture of starch and potassium permanganate, $KMnO_4$. The results of this test were as follows:

| Product | Percent wt. | Percent Fe | Percent Fe rec. |
| --- | --- | --- | --- |
| Feed | 100.0 | 21.70 | 100.0 |
| 1st froth | 61.8 | 3.82 | 10.9 |
| 2nd froth | 7.0 | 14.47 | 4.6 |
| 3rd froth | 1.2 | 38.45 | 2.2 |
| Concentrate [1] | 30.0 | 59.51 | 82.3 |

[1] Containing 5.59— $SiO_2$.

EXAMPLE II

*Starch treated with chlorinated lime*

In this example, the starch solution was made by boiling an aqueous mixture of starch and chlorinated lime having 24% available chlorine. The results of this test were as follows:

| Product | Percent wt. | Percent Fe | Percent Fe rec. |
| --- | --- | --- | --- |
| Feed | 100.0 | 21.91 | 100.0 |
| 1st froth | 56.1 | 4.06 | 10.4 |
| 2nd froth | 13.0 | 11.87 | 7.1 |
| 3rd froth | 2.8 | 44.71 | 5.7 |
| Concentrate [1] | 28.1 | 59.92 | 76.8 |

[1] Containing 5.31— $SiO_2$.

EXAMPLE III

*Starch treated with hydrogen peroxide*

In this example, the starch solution was prepared by boiling an aqueous mixture of starch and hydrogen peroxide, the latter being in the form of a 3% solution. The results of this test were as follows:

| Product | Percent wt. | Percent Fe | Percent Fe rec. |
| --- | --- | --- | --- |
| Feed | 100.0 | 21.59 | 100.0 |
| 1st froth | 31.7 | 5.58 | 8. |
| 2nd froth | 29.5 | 7.08 | 9. |
| 3rd froth | 12.3 | 24.06 | 13. |
| Concentrate | 26.5 | 55.76 | 68. |

EXAMPLE IV

*Starch treated with ammonium persulphate*

In this example, the starch solution was prepared by boiling an aqueous mixture of starch and ammonium persulphate $(NH_4)_2S_2O_8$. The results of this test were as follows:

| Product | Percent wt. | Percent Fe | Percent Fe rec. |
| --- | --- | --- | --- |
| Feed | 100.0 | 21.66 | 100 |
| First froth | 45.7 | 3.87 | 8 |
| Second froth | 18.6 | 7.71 | 6 |
| Third froth | 4.7 | 21.48 | 5 |
| Concentrate | 31.0 | 56.00 | 80. |

EXAMPLE V

*Starch treated with sodium hypochlorite*

In this example, the starch solution was prepared by boiling an aqueous mixture of starch with sodium hypochlorite, $NaOCl$. The sodium hypochlorite employed was the well-known product sold under the name "Chlorox" which is a 5.25% water solution. However, only the sodium hypochlorite is considered in the ratio of 93 to 7 of the starch to the oxidizing agent. The results of this test were as follows:

| Product | Percent wt. | Percent Fe | Percent Fe rec. |
| --- | --- | --- | --- |
| Feed | 100.0 | 21.94 | 100.0 |
| First froth | 50.6 | 3.31 | 7.6 |
| Second froth | 15.3 | 7.77 | 5.4 |
| Third froth | 3.2 | 28.35 | 4.2 |
| Concentrate | 30.9 | 58.79 | 82.8 |

EXAMPLE VI

*Starch treated with phosphorous oxychloride*

In this example, the starch solution was prepared by boiling starch with phosphorous oxychloride, $POCl_3$. The results of this test were as follows:

| Product | Percent wt. | Percent Fe | Percent Fe rec. |
| --- | --- | --- | --- |
| Feed | 100.0 | 21.76 | 100.0 |
| First froth | 49.3 | 4.30 | 9.7 |
| Second froth | 19.7 | 9.89 | 9.0 |
| Third froth | 3.4 | 39.17 | 6.1 |
| Concentrate | 27.6 | 59.28 | 75.2 |

EXAMPLE VII

*Starch treated with sodium peroxide*

In this example, the starch solution was prepared by boiling an aqueous mixture of starch and sodium peroxide, $Na_2O_2$ in the proportion of 97-3, which was used in a 2% solution. The results of this test were as follows:

| Product | Percent wt. | Percent Fe | Percent Fe rec. |
|---|---|---|---|
| Feed | 100.0 | 21.40 | 100.0 |
| First froth | 39.3 | 3.41 | 6.2 |
| Second froth | 24.6 | 3.90 | 4.5 |
| Third froth | 4.6 | 12.18 | 2.7 |
| Concentrate | 31.5 | 58.87 | 86.6 |

The following Examples VIII to X show successful results of practicing the invention with various anionic collecting agents of the kind mentioned earlier in this specification and defined in claim 1 hereof.

EXAMPLE VIII

*Linoleic acid as the anionic collecting reagent*

In this example, the procedures were identical with those in Example VII, except that linoleic acid was employed in place of Varlacoid, and the cresylic acid was omitted. The results of this test were as follows:

| Product | Percent wt. | Percent Fe | Percent Fe rec. |
|---|---|---|---|
| Feed | 100.0 | 21.25 | 100.0 |
| First froth | 53.9 | 3.25 | 8.2 |
| Second froth | 11.9 | 4.46 | 2.5 |
| Third froth | 2.2 | 14.13 | 1.5 |
| Concentrate | 32.0 | 58.30 | 87.8 |

EXAMPLE IX

*Fish oil fatty acid as the anionic collecting reagent*

In this example, the procedures were identical with those in Example VII, except that Upjohn's fatty acid (a fish-oil fatty acid) was substituted for Varlacoid, and cresylic acid was omitted. The results of this test were as follows:

| Product | Percent wt. | Percent Fe | Percent Fe rec. |
|---|---|---|---|
| Feed | 100.0 | 21.09 | 100.0 |
| First froth | 53.2 | 2.76 | 6.9 |
| Second froth | 8.9 | 3.89 | 1.7 |
| Third forth | 3.8 | 6.82 | 1.2 |
| Concentrate | 34.1 | 55.78 | 90.2 |

EXAMPLE X

*Sodium resinate as the anionic collecting reagent*

In this example, the procedures were identical with the procedures in Example VII, except that sodium resinate was employed in the place of Varlacoid (cresylic acid being omitted) and the quantities of sodium resinate were 0.6 lb. in the first float, and 0.2 lb. in each of the second and third floats. The results of this test were as follows:

| Product | Percent wt. | Percent Fe | Percent Fe rec. |
|---|---|---|---|
| Feed | 100.0 | 21.33 | 100.0 |
| First froth | 57.0 | 3.41 | 9.1 |
| Second froth | 9.7 | 5.68 | 2.6 |
| Third forth | 1.2 | 10.23 | 0.6 |
| Concentrate | 32.1 | 58.30 | 87.7 |

What is claimed is:

1. The method of concentrating finely-divided oxidized-iron ores in which the gangue ingredient is principally quartz, which consists in treating an aqueous pulp of such an ore with an anionic collecting agent selected from the class consisting of higher fatty acids and resin acids and mixtures of fatty and resin acids and soaps thereof, and with cooperating agents consisting of lime and an aqueous solution of starch solubilized by treatment with an oxidizing agent, and subjecting the thus treated ore pulp to froth-flotation treatment and removing the silica-containing froth, thereby producing in the residue of the pulp an oxidized-iron concentrate.

2. A method according to claim 1, in which the starch has been treated by boiling it with an oxidizing agent in an aqueous mixture.

3. A method according to claim 1, in which the starch has been treated by boiling it with an oxidizing agent in an aqueous mixture only long enough to produce partial depolymerization and not dextrin.

4. A method according to claim 1, in which the starch has been treated by boiling it with potassium permanganate in an aqueous mixture.

5. A method according to claim 1, in which the starch has been treated by boiling it with sodium hypochlorite in an aqueous mixture.

6. A method according to claim 1, in which the starch has been treated by boiling it with sodium peroxide in an aqueous mixture.

EARL H. BROWN.
FRANCIS X. TARTARON.